(12) United States Patent
Cain et al.

(10) Patent No.: US 8,463,569 B2
(45) Date of Patent: Jun. 11, 2013

(54) METHOD OF OPERATING A MAGNETIC COMPASS ON A MACHINE

(75) Inventors: Gary Lynn Cain, Springfield, OH (US); Chad Curtis Apple, Troy, OH (US); Bruce Wayne Enix, Tipp City, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 319 days.

(21) Appl. No.: 13/052,393

(22) Filed: Mar. 21, 2011

(65) Prior Publication Data
US 2012/0245874 A1    Sep. 27, 2012

(51) Int. Cl.
*G01C 17/38*   (2006.01)

(52) U.S. Cl.
USPC .......................................................... 702/92

(58) Field of Classification Search
USPC .......................................................... 702/92
See application file for complete search history.

(56) References Cited

U.S. PATENT DOCUMENTS

| | | |
|---|---|---|
| 4,327,498 A | 5/1982 | Setter et al. |
| 4,412,387 A | 11/1983 | Lenko |
| 4,698,912 A | 10/1987 | Fowler et al. |
| 4,862,594 A | 9/1989 | Schierbeek et al. |
| 4,918,824 A | 4/1990 | Farrar |
| 4,995,165 A | 2/1991 | Daniels |
| 5,046,260 A | 9/1991 | Wellhausen |
| 5,161,311 A | 11/1992 | Esmer et al. |
| 5,187,872 A | 2/1993 | Dufour |
| 5,850,624 A | 12/1998 | Gard et al. |
| 5,878,370 A | 3/1999 | Olson |
| 6,543,146 B2 | 4/2003 | Smith et al. |
| 6,671,622 B2 | 12/2003 | McCall et al. |
| 6,877,237 B1 | 4/2005 | Withanawasam |
| 7,149,627 B2 | 12/2006 | Ockerse et al. |
| 7,613,581 B2 | 11/2009 | Skvortsov et al. |
| 8,340,873 B2 * | 12/2012 | Finley et al. ................ 701/50 |
| 2008/0071492 A1 | 3/2008 | Skvortsov et al. |
| 2008/0097693 A1 * | 4/2008 | McCain ...................... 701/213 |

OTHER PUBLICATIONS

Bro, M. et al.; Smart Calibration of Excavators; An ESGI54 Project from Mikrofyn; pp. 1-34, Jun. 13, 2011.
Miller, J.; Mini Rover 7—Electronic Compassing for Mobile Robotics; Circuit Cellar; Apr. 2004; pp. 14-22; Issue 165.
Caruso, M.J.; Applications of Magnetic Sensors for Low Cost Compass Systems; Honeywell, SSEC; pp. 1-8, Jun. 13, 2011.
Healey, A.J. et al.; On Line Compensation of Heading Sensor Bias for Low Cost AUVs; Proceedings IEEE AUV98 Workshop on Underwater Navigation, Draper Laboratories, Cambridge, Mass.; Aug. 21-22, 1998; pp. 1-7.
Caruso, M.J. et al.; Vehicle Detection and Compass Applications using AMR Magnetic Sensors; www.ssec.honeywell.com; pp. 1-13, Jun. 13, 2011.

* cited by examiner

*Primary Examiner* — Aditya Bhat
(74) *Attorney, Agent, or Firm* — Dinsmore & Shohl LLP

(57) ABSTRACT

A method of determining the heading of an excavator at a worksite uses a magnetic field sensor, mounted on the excavator, inclinometers that provide an indication of the pitch and roll of the excavator, a gyroscopic sensor that senses the rotational rate of the excavator about the Z axis of the magnetic field sensor, and a processor circuit, having an associated memory. A calibration table of data is created and stored using the gyroscopic sensor as the excavator is rotated at a uniform velocity. The sensed indications of the magnetic field from the coordinate reference frame of the sensor are transformed to the local level plane coordinate reference frame using the outputs from the inclinometers.

20 Claims, 6 Drawing Sheets

METHOD OF OPERATING A MAGNETIC COMPASS ON A MACHINE

CROSS-REFERENCE TO RELATED APPLICATIONS

None.

STATEMENT REGARDING FEDERALLY SPONSORED RESEARCH OR DEVELOPMENT

Not Applicable.

BACKGROUND

This relates a magnetic compass arrangement for use in a machine and, more particularly, to a method of using a magnetic compass arrangement in a movable machine or vehicle, such as for example an excavator. Sensor arrangements which sense the direction of the magnetic field of the earth and provide outputs for display and use by a control system have been used for some time. Such arrangements have been subjected to, and have had to compensate for, "hard iron" effects and "soft iron" effects. Both of these effects distort the shape of the earth's flux lines in the local area of the sensor, but do so in different ways. Hard iron effects arise from permanent magnets and magnetized iron or steel in the vehicle. Hard iron effects cause the earth's magnetic field to be offset in a particular direction and do not change as the machine, such as an excavator, is rotated about a vertical axis. The errors induced by hard iron effects go through a single cycle during a complete rotation of the machine. Soft iron effects arise from the interaction of the earth's magnetic field with the magnetically permeable material of the excavator. Soft iron effects change as the machine is rotated, and the errors induced by soft iron effects go through two cycles during a complete rotation of the machine.

Typically, the earth's magnetic field is sensed with three magnetic field sensors which are oriented to detect the strength of the earth's field in three orthogonal directions, the X, Y, and Z directions of the sensor's coordinate frame of reference. From the relative outputs of the three sensors it is a simple matter to determine the relative orientation and strength of the field with respect to the sensor. It will be appreciated that if the sensor coordinate reference frame is not aligned with the local level plane coordinate reference frame of the worksite, then the sensed indications of the magnetic field from the X, Y and Z coordinate reference frame of the sensor must be transformed to the local level plane coordinate reference frame to determine the direction of the flux and therefore the heading of the machine with respect to the worksite.

Various approaches have been used in the past to compensate magnetic compass systems for hard iron effects and soft iron effects. Many of these prior art calibration techniques have required extensive measurement of magnetic field strength with the machine and compass oriented in various directions, as a part of an extended cumbersome calibration routine.

SUMMARY

A method of determining the heading of an excavator at a worksite uses a magnetic field sensor, mounted on the excavator. The magnetic field sensor provides indications of the magnitude of the magnetic field of the earth in the X, Y and Z directions of the sensor. The method uses inclinometers that provide an indication of the pitch and roll of the excavator, a gyroscopic sensor that senses rotation of the excavator about the Z axis of the magnetic field sensor, and a processor circuit, having an associated memory. The processor circuit is responsive to the magnetic field sensor, the inclinometers, and the gyroscopic sensor. The method includes creating and storing a calibration table of data, sensing the magnetic field at the excavator with the magnetic field sensor, providing indications of the magnitude of the magnetic field in the X, Y and Z directions of the sensor, transforming the sensed indications of the magnetic field from the X, Y and Z coordinate reference frame of the sensor to the local level plane coordinate reference frame using the outputs from the inclinometers, determining the hard iron components of the transformed sensed indication of the magnetic field and removing such hard iron components to produce corrected indications of the magnetic field in the local level plane coordinate reference frame, and comparing the corrected indications to the stored, scaled data to determine the heading of the excavator. The step of creating and storing a calibration table of data includes rotating the excavator at substantially constant speed about a generally vertical Z axis, storing the outputs from the magnetic field sensor, and the gyroscopic sensor, determining the beginning and end of a complete rotation of the excavator based on the repetition of data values from the magnetic field sensor, scaling the data received from the gyroscopic sensor during the complete rotation and the corresponding data received from the magnetic field sensor into substantially equal angular increments, and storing such scaled data.

Creating and storing a calibration table of data may further include compensating the stored outputs for hard iron induced errors. Creating and storing a calibration table of data may further include benching the excavator by rotating it to a predetermined reference heading, and determining the corresponding data from the table which represents the predetermined heading, whereby the balance of the data represents headings of the excavator in angular increments away from the predetermined reference heading. Scaling the data received from the gyroscopic sensor during the complete rotation and the corresponding indications data received from the magnetic field sensor into substantially equal angular increments may comprise scaling the data received from the gyroscopic sensor during the complete rotation and the corresponding indications data received from the magnetic field sensor into one degree increments.

Determining the hard iron components of the transformed sensed indication of the magnetic field may comprise positioning the excavator to have a heading toward magnetic north, sensing the magnetic field at the excavator with the magnetic field sensor, providing indications of the magnitude of the magnetic field in the X, Y and Z directions of the sensor, sensing the pitch and roll of the excavator, pitching the excavator by a few degrees, sensing the magnetic field at the excavator with the magnetic field sensor, providing indications of the magnitude of the magnetic field in the X, Y and Z directions of the sensor, and sensing the pitch and roll of the excavator.

DETAILED DESCRIPTION

Excavating and construction machine control systems commonly incorporate magnetic compasses among a number of sensors. Such compasses sense the orientation of the machine or a portion of the machine in relation to the magnetic field of the earth. This heading information, combined with other sensor generated data, is compared against desired contour data and the machine is controlled accordingly.

Although magnetic compass systems are relatively simple and dependable, conventional calibration techniques for electronic compass systems are difficult to implement and fall short of providing a highly accurate solution for electronic compasses mounted to large excavation machines. The massive iron content of such a machine either adds to or distorts the earth's magnetic field vector, making it difficult to achieve an accurate calibration. Further, such machines typically include electric motors and other sources of electromagnetic fields which add to or subtract from the effects of the earth's magnetic field, introducing further errors in heading measurement.

Figure 1:
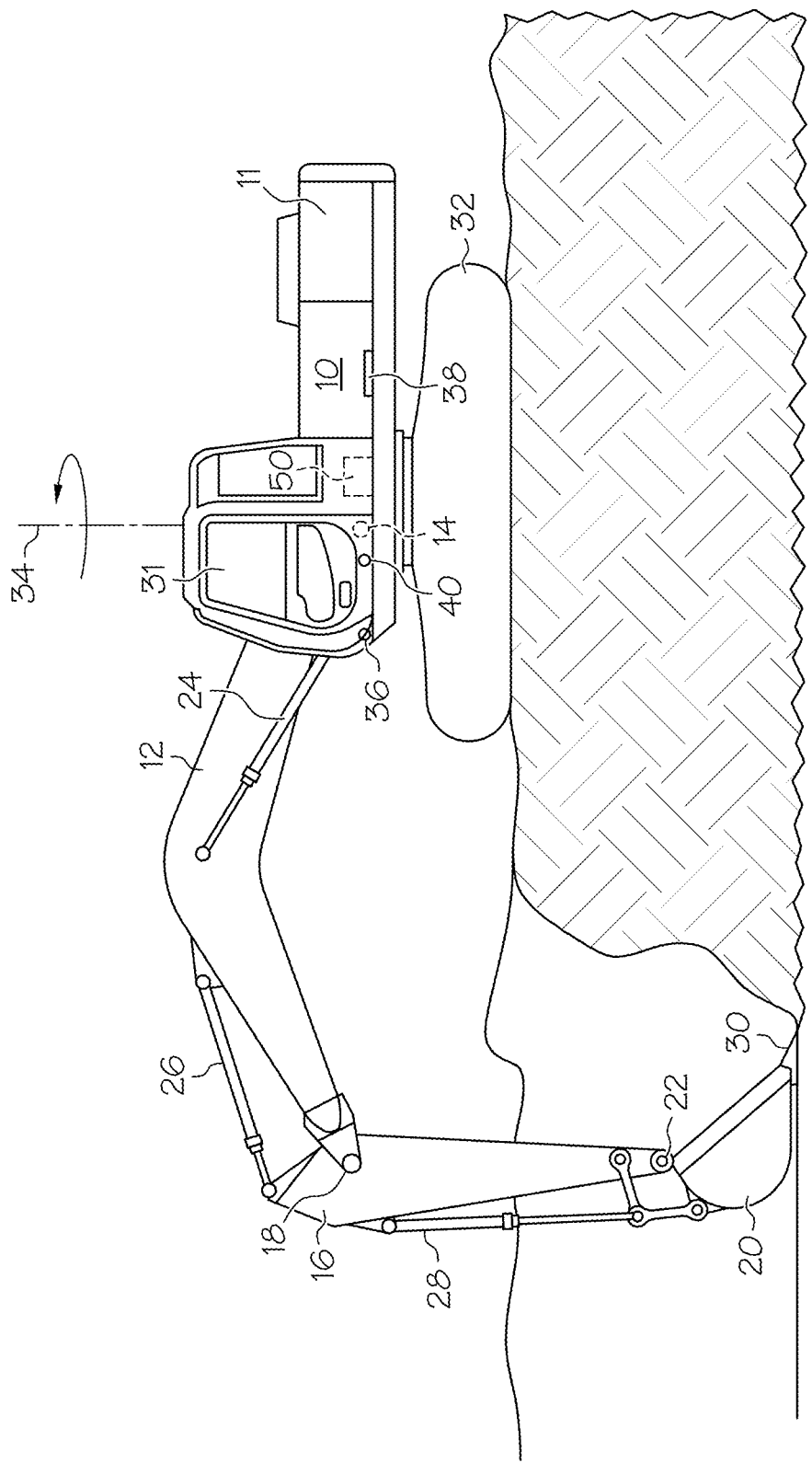
FIG. 1 illustrates an excavator of the type utilizing an electronic compass.

FIG. 1 depicts an excavator 10 of the type that may incorporate a system for determining heading by sensing the magnetic field of the earth and correcting for hard iron effects and soft iron effects. The excavator includes a chassis 11, a boom 12 pivotally secured to the chassis 11 at a first pivot joint 14, a dipper stick 16 pivotally secured to the boom 12 at a second pivot joint 18, and a bucket 20 pivotally secured to the dipper stick 16 at a third pivot joint 22. Hydraulic cylinders 24, 26, and 28 are provided to move the boom 12, dipper stick 16, and bucket 20, respectively. Bucket 20 includes a cutting edge 30 that may have serrated teeth to assist in digging. The chassis 11 carries a cab 31 and is supported on an undercarriage support and transport 32 which may include track belts that facilitate the movement of the excavator 10 over the job site. The chassis 11 and the components it carries can be rotated about a generally vertical axis 34 with respect to the undercarriage support and transport 32 to place the bucket 20 at the precise location needed for excavation.

Figure 6:
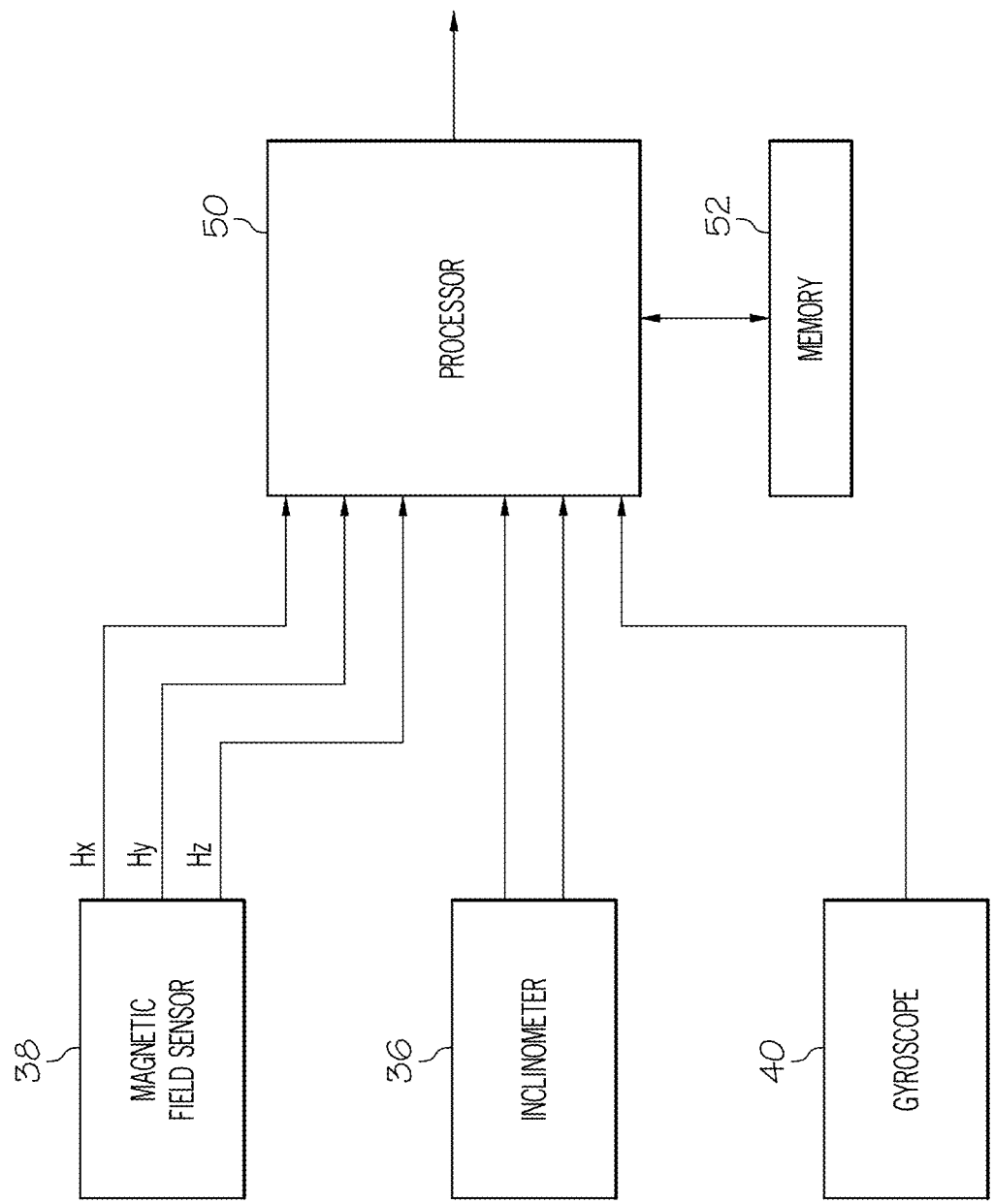
FIG. 6 is a diagrammatic representation of a processor circuit and associated components for practicing the compensation method.

For the operator to control the operation of the excavator either manually or through an automated control system, information regarding both the location and orientation of the excavator must be determined. The location of the excavator may be determined in any one of a number of ways, including using a laser positioning system, using a GPS positioning system, using a system that combines laser and GPS positioning, or using a robotic total station. The relative positions of the boom 12, the dipper 16, and the bucket 20 may be determined by angle encoders, gravity based inclinometers, or similar sensors associated with pivot joints 14, 18, and 22, or by string encoders associated with cylinders 24, 26, and 28, or by some combination of such sensors. The orientation of the excavator 10 with respect to true vertical is determined by inclinometer 36, mounted on the chassis 11. The inclinometer 36 operates in two axes and provides an indication of the angle of roll and the angle of pitch of the chassis 11. As explained more completely, below, the system further includes a magnetic field sensor 38 that provides indications of the magnitude of the magnetic field of the earth in the X, Y and Z directions of the sensor reference frame. Additionally system includes a gyroscope sensor 40 that senses the rotation of the excavator about the Z axis 34 of the magnetic field sensor 38. As will be explained below, a processor circuit 50, having an associated memory 52 (FIG. 6), is responsive to the magnetic field sensor 38, the inclinometer 36, and the gyroscopic sensor 40, determines the heading of the excavator 10 at the worksite. Although shown as separate components, it will be appreciated by those skilled in the art that the inclinometer 36 and magnetic field sensor 38 may be mounted in the same housing. Further, the inclinometers and gyroscopic sensors may take the form of an IMU, an inertial measurement unit, or similar device, in which some or all of the magnetic field, gravity and gyroscopic sensors are packaged together as a single component. Additionally, although inclinometers are described, below, other equivalent gravity reference sensors may be used.

The heading of the excavator is the direction in which the longitudinal axis of the chassis 11 is aligned. This is determined by the magnetic compass system which detects the relative orientation of the chassis 11 to the magnetic field of the earth. The magnetic compass system enhances accuracy by taking into account soft iron effects and hard iron effects.

In order to compensate for soft iron effects, the machine is rotated through a complete rotation. The inclination of the chassis 11 is noted, along with the levels of the magnetic field sensed in the X, Y and Z directions of the magnetic field sensor 38. The gyroscope 40 is used to break up the rotation of the machine into small angular increments, such as 360 equal one-degree increments.

The difficulty encountered when using the integrated gyro signal to build a soft iron calibration table is that the output of the gyroscopic sensor is slightly non-linear. Each gyroscopic sensor undergoes a factory calibration, but in order to achieve superior results, the gyroscope must be recalibrated on the machine, as well. Additionally, sensor aging, temperature, and the magnitude of the rotational rate contribute to the need to repeatedly recalibrate the gyroscopic sensor on the machine over its useful life. When the gyroscope is rescaled appropriately, it provides a highly accurate measure of angular position, permitting an accurate calibration table to be compiled. It has been found that the uncompensated outputs of the magnetic field sensor may be used to determine when a full rotation has been made, since those outputs return to the same level upon a complete 360 degree rotation.

Next, the effects of hard iron on the magnetic sensor are extracted based on specific equations which require the local inclination angle of the earth's magnetic vector. To determine the local inclination angle of the earth's magnetic vector, we take a measurement of the magnetic sensors, along with the pitch and roll of the sensors when the machine is facing magnetic north. The operator then pitches the machine a few degrees. A new set of magnetic sensor readings and pitch and roll readings is captured. From this information, the local inclination angle is determined, as explained below.

At this point, the horizontal soft iron effects are removed, the horizontal hard iron effects are removed, and the vertical hard iron effects are removed. In order to improve the machine heading accuracy even further, the vertical soft iron effects are removed. This is done by characterizing the Z axis magnetic sensor during the machine rotation portion of the calibration procedure.

This system may be used as a heading sensor for an excavator. As the machine rotates around in position, the system continuously provides accurate heading information that is used as an input for precise control. When the excavator is moved to a different location at the work site, the recalibration process may be repeated for maximum accuracy.

Figure 2:
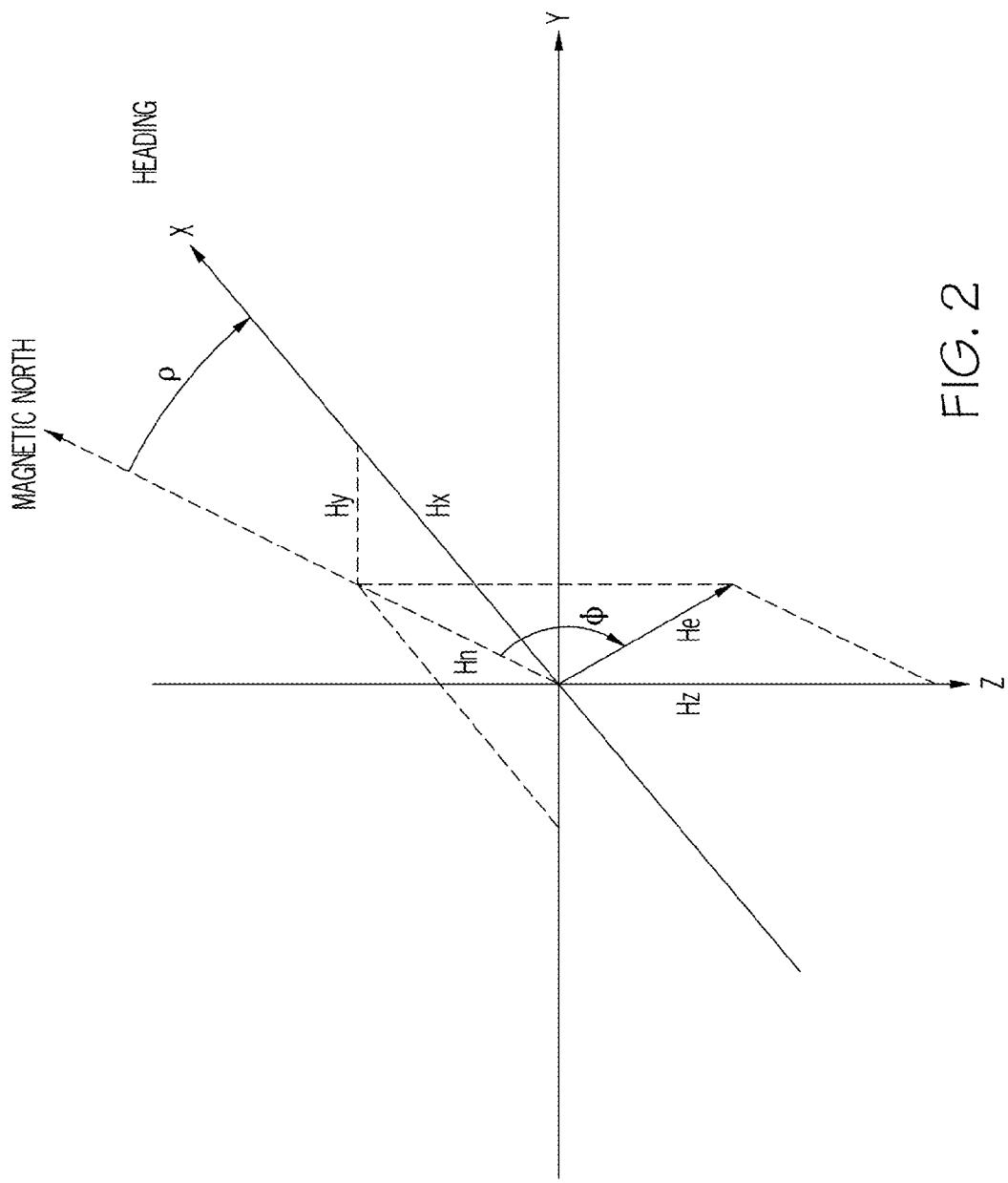
FIG. 2 is a drawing illustrating heading parameters.
Figure 3:
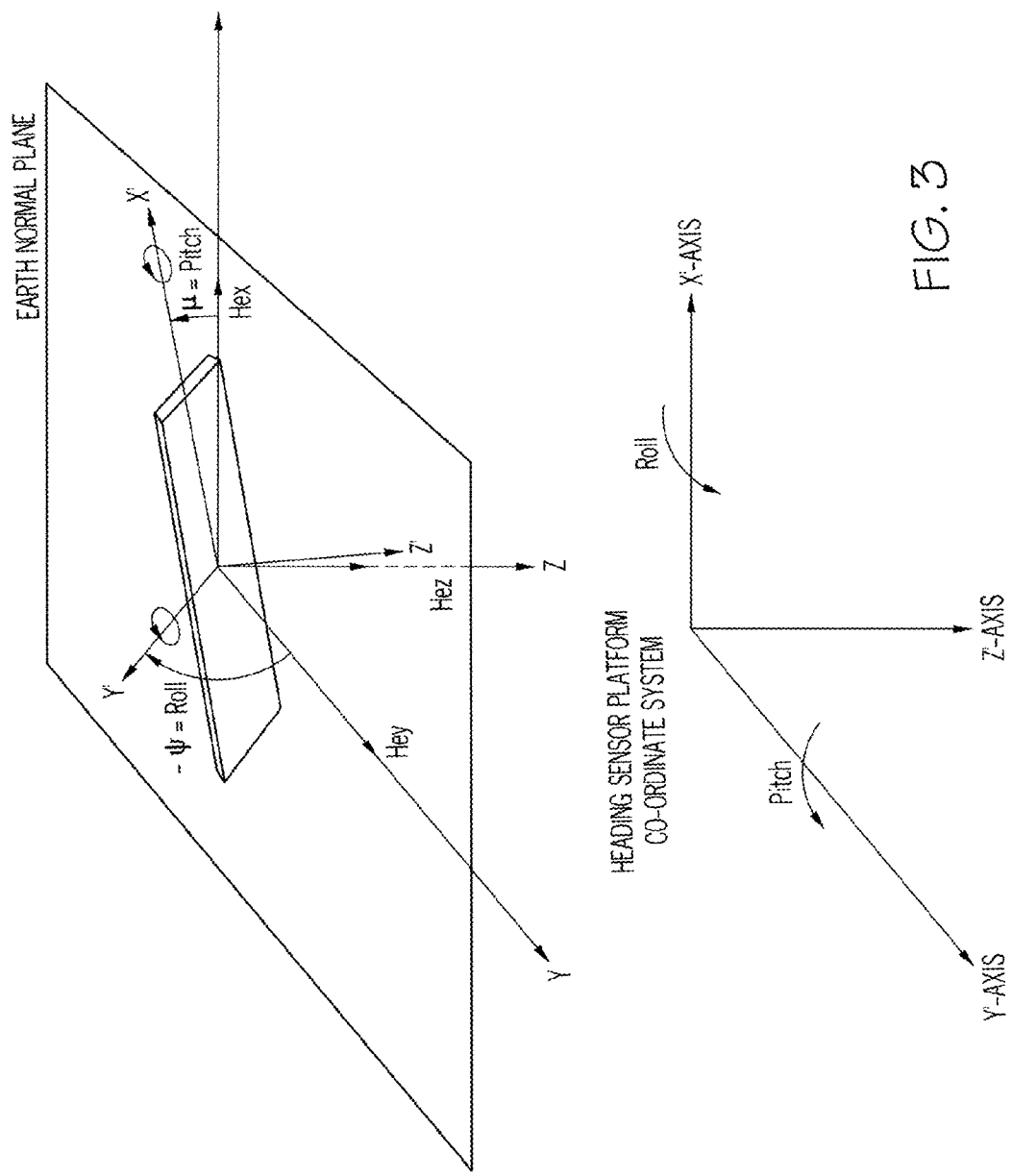
FIGS. 3 and 4 are drawings illustrating the relationships between the machine, the earth's frame of reference and the sensor frame of reference.

Reference is now made to FIGS. 2 and 3. The positive X-axis is defined as the heading direction. A positive heading angle ($\rho$) is measured from the magnetic north vector to the X axis when viewed on the earth normal plane from the negative Z axis.

$$Hn = He \cdot \cos(\phi)$$

$$Hx = Hn \cdot \cos(\rho)$$

$$Hy = Hn \cdot \sin(\rho)$$

1. $Hx = He \cdot \cos(\phi) \cdot \cos(\rho)$
2. $Hy = He \cdot \cos(\phi) \cdot \sin(\rho)$
3. $Hz = He \cdot \sin(\phi)$ $$\begin{bmatrix} Hx \\ Hy \\ Hz \end{bmatrix} = He \begin{bmatrix} \cos\Phi\cos\rho \\ \cos\Phi\sin\rho \\ \sin\Phi \end{bmatrix}$$

$$M = \begin{bmatrix} \cos\Phi\cos\rho \\ \cos\Phi\sin\rho \\ \sin\Phi \end{bmatrix}$$

Figure 4:
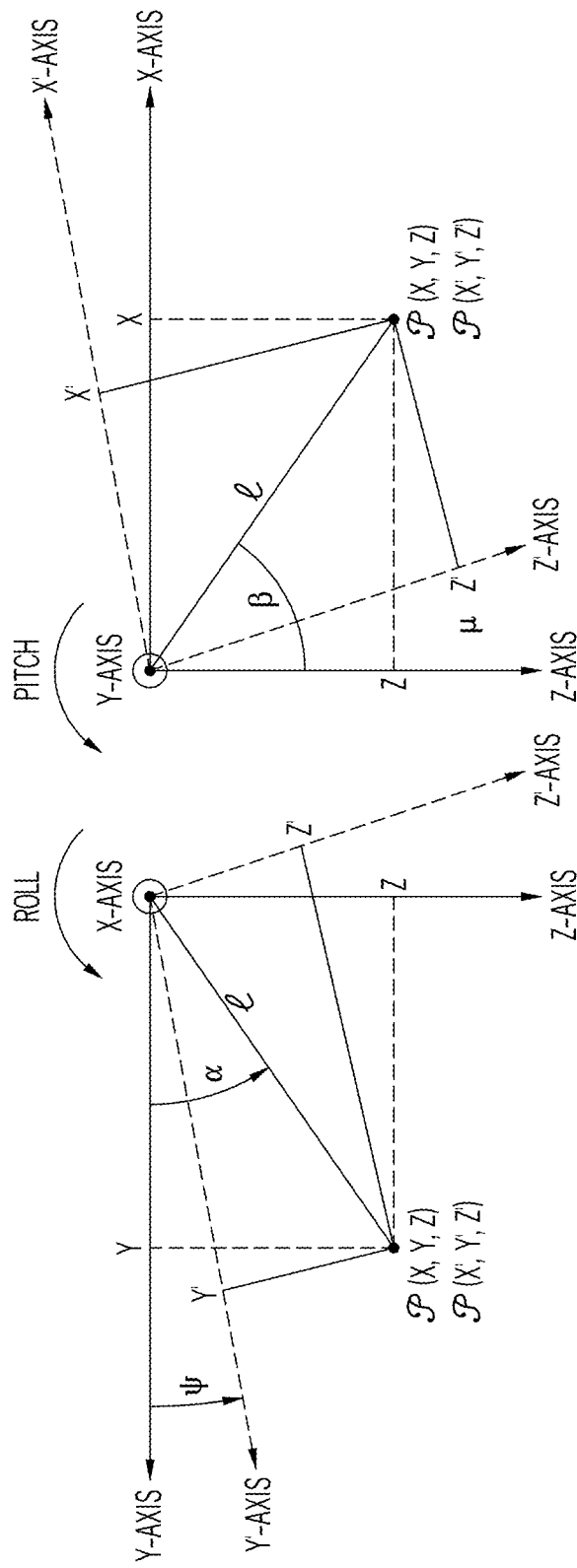

4. $H_{EN} = He \cdot M$
5. $\rho = -\tan^{-1}(Hy/Hx)$   $Hx > 0, Hy <= 0$   $0° <= \rho < 90°$
6. $\rho = 90°$   $Hx = 0, Hy < 0$
7. $\rho = 180 - \tan^{-1}(Hy/Hx)$   $Hx < 0$   $90° < \rho < 270°$
8. $\rho = 270$   $Hx = 0, Hy > 0$
9. $\rho = 360 - \tan^{-1}(Hy/Hx)$   $Hx > 0, Hy > 0$   $270° < \rho < 360°$ Next we derive the rotation matrix between the heading sensor plane and earth normal. Reference is now made to FIGS. 3 and 4.

Roll (X) Axis:

$x'=x$   10.

$\tan\alpha = z/y$ $\cos\alpha = y/l$ $l = y/\cos\alpha$ $\sin(\alpha-\psi) = y'/l$ $\cos(\alpha-\psi) = y'/l$ $z' = l\sin(\alpha-\psi) = (y/\cos\alpha)\sin(\alpha-\psi)$ $\sin(\alpha-\psi) = \sin\alpha\cos\psi - \cos\alpha\sin\psi$ $z' = y(\tan\alpha\cos\psi - \sin\psi) = y[(z/y)\cos\psi - \sin\psi]$ $z' = -y\sin\psi + z\cos\psi$   11.

$y' = l\cos(\alpha-\psi) = (y/\cos\alpha)\cos(\alpha-\psi)$ $\cos(\alpha-\psi) = \cos\alpha\cos\psi + \sin\alpha\sin\psi$ $y' = y(\cos\psi + \tan\alpha\sin\psi) = y[\cos\psi + (z/y)\sin\psi]$ $y' = y\cos\psi + z\sin\psi$   12.

Using equations 10, 11 and 12, above, to define the rotation matrix in roll:

$$R_{Roll} = \begin{bmatrix} 1 & 0 & 0 \\ 0 & \cos\psi & \sin\psi \\ 0 & -\sin\psi & \cos\psi \end{bmatrix}$$

Pitch (Y) Axis:

$y'=y$   13.

$\tan\beta = x/z$ $\cos\beta = z/l$ $l = z/\cos\beta$ $\sin(\beta-\mu) = x'/l$ $\cos(\beta-\mu) = z'/l$ $x' = l\sin(\beta-\mu) = (z/\cos\beta)\sin(\beta-\mu)$ $\sin(\beta-\mu) = \sin\beta\cos\mu - \cos\beta\sin\mu$ $x' = z(\tan\beta\cos\mu - \sin\mu) = z[(x/z)\cos\mu - \sin\mu]$ $x' = x\cos\mu - z\sin\mu$   14.

$z' = l\cos(\beta-\mu) = (z/\cos\beta)\cos(\beta-\mu)$ $\cos(\beta-\mu) = \cos\beta\cos\mu + \sin\beta\sin\mu$ $z' = z(\cos\mu + \tan\beta\sin\mu) = z[\cos\mu + (x/z)\sin\mu]$ $z' = x\sin\mu + z\cos\mu$   15.

Using equations 13, 14 and 15, above, to derive the rotation matrix in pitch:

$$R_{pitch} = \begin{bmatrix} \cos\mu & 0 & -\sin\mu \\ 0 & 1 & 0 \\ \sin\mu & 0 & \cos\mu \end{bmatrix}$$

Multiply the pitch rotation matrix by the roll matrix to develop the complete rotation matrix from earth normal to heading sensor plane.

$$R = R_{Pitch}R_{Roll}$$

$$R = \begin{bmatrix} \cos\mu & 0 & -\sin\mu \\ 0 & 1 & 0 \\ \sin\mu & 0 & \cos\mu \end{bmatrix} \begin{bmatrix} 1 & 0 & 0 \\ 0 & \cos\psi & \sin\psi \\ 0 & -\sin\psi & \cos\psi \end{bmatrix}$$

$$R = \begin{bmatrix} \cos\mu & \sin\mu\sin\psi & -\sin\mu\cos\psi \\ 0 & \cos\psi & \sin\psi \\ \sin\mu & -\cos\mu\sin\psi & \cos\mu\cos\psi \end{bmatrix}$$

To rotate from heading sensor plane to earth normal use the transpose of R.

$$R^T = \begin{bmatrix} \cos\mu & 0 & \sin\mu \\ \sin\mu\sin\psi & \cos\psi & -\cos\mu\sin\psi \\ -\sin\mu\cos\psi & \sin\psi & \cos\mu\cos\psi \end{bmatrix}$$

$$H_{EN} = R^T H_{HS}$$

$$\begin{bmatrix} Hx \\ Hy \\ Hz \end{bmatrix} = \begin{bmatrix} \cos\mu & 0 & \sin\mu \\ \sin\mu\sin\psi & \cos\psi & -\cos\mu\sin\psi \\ -\sin\mu\cos\psi & \sin\psi & \cos\mu\cos\psi \end{bmatrix} \begin{bmatrix} Hx' \\ Hy' \\ Hz' \end{bmatrix}$$

Since we only need the X and Y components of the earth's magnetic field to calculate heading with equations 4 through 8 above, use the following equations:

$$Hx = Hx' \cos\mu + Hz' \sin\mu \quad\quad 16$$

$$Hy = Hx' \sin\mu \sin\psi + Hy' \cos\psi - Hz' \cos\mu \sin\psi \quad\quad 17$$

Next, we derive earth's magnetic components in heading sensor plane with hard iron influence.

$$H_{HS} = R H_{EN}$$

Adding hard iron:

$$H_{HSmeas} = R H_{EN} + H_{HI}$$

Substitute equation 4:

$$H_{HSmeas} = He \cdot RM + H_{HI} \quad\quad 18.$$

Removing hard iron using data obtained on level and sloped surfaces:

$$H_{HSmeasLVL} - H_{HSmeasSLP} = He \cdot R_{LVL} M + H_{HI} - He \cdot R_{SLP} M - H_{HI}$$

$$H_{HSmeasLVL} - H_{HSmeasSLP} = He \cdot [R_{LVL} M - R_{SLP} M]$$

$$H_{HSmeasLVL} - H_{HSmeasSLP} = He \cdot [R_{LVL} - R_{SLP}] M \quad\quad 19.$$

Expanding equation 19:

$$(H_{HSmeasLVL} - H_{HSmeasSLP})x = He[\cos\phi \cos\rho(\cos\mu_L - \cos\mu_S) + \cos\phi \sin\rho(\sin\mu_L \sin\psi_L - \sin\mu_S \sin\psi_S) - \sin\phi(\sin\mu_L \cos\psi_L - \sin\mu_S \cos\psi_S)] \quad\quad 20.$$

$$(H_{HSmeasLVL} - H_{HSmeasSLP})y = He[\cos\phi \sin\rho(\cos\psi_L - \cos\psi_S) + \sin\phi(\sin\psi_L - \sin\psi_S)] \quad\quad 21.$$

$$(H_{HSmeasLVL} - H_{HSmeasSLP})z = He[\cos\phi \cos\rho(\sin\mu_L - \sin\mu_S) - \cos\phi \sin\rho(\cos\mu_L \sin\psi_L - \cos\mu_S \sin\psi_S) + \sin\phi(\cos\mu_L \cos\psi_L - \cos\mu_S \cos\psi_S)] \quad\quad 22.$$

Since the left side of 19 is composed of on machine measurements, we write:

$$K = (H_{HSmeasLVL} - H_{HSmeasSLP})x / (H_{HSmeasLVL} - H_{HSmeasSLP})z$$

$$K = He([\cos\phi \cos\rho(\cos\mu_L - \cos\mu_S) + \cos\phi \sin\rho(\sin\mu_L \sin\psi_L - \sin\mu_S \sin\psi_S) - \sin\phi(\sin\mu_L \cos\psi_L - \sin\mu_S \cos\psi_S)] / He[\cos\phi \cos\rho(\sin\mu_L - \sin\mu_S) - \cos\phi \sin\rho(\cos\mu_L \sin\psi_L - \cos\mu_S \sin\psi_S) + \sin\phi(\cos\mu_L \cos\psi_L - \cos\mu_S \cos\psi_S)]$$

$$\cos\phi \cos\rho(\cos\mu_L - \cos\mu_S) + \cos\phi \sin\rho(\sin\mu_L \sin\psi_L - \sin\mu_S \sin\psi_S) - \sin\phi(\sin\mu_L \cos\psi_L - \sin\mu_S \cos\psi_S) = K \cos\phi \cos\rho(\sin\mu_L - \sin\mu_S) - K \cos\phi \sin\rho(\cos\mu_L \sin\psi_L - \cos\mu_S \sin\psi_S) + K \sin\phi(\cos\mu_L \cos\psi_L - \cos\mu_S \cos\psi_S)$$

Divide by $\cos\phi$:

$$\cos\rho(\cos\mu_L - \cos\mu_S) + \sin\rho(\sin\mu_L \sin\psi_L - \sin\mu_S \sin\psi_S) - \tan\phi(\sin\mu_L \cos\psi_L - \sin\mu_S \cos\psi_S) = K \cos\rho(\sin\mu_L - \sin\mu_S) - K \sin\rho(\cos\mu_L \sin\psi_L - \cos\mu_S \sin\psi_S) + K \tan\phi(\cos\mu_L \cos\psi_L - \cos\mu_S \cos\psi_S)$$

$$\tan\phi(\sin\mu_L \cos\psi_L - \sin\mu_S \cos\psi_S) + K \tan\phi(\cos\mu_L \cos\psi_L - \cos\mu_S \cos\psi_S) = -K \cos\rho(\sin\mu_L - \sin\mu_S) + K \sin\rho(\cos\mu_L \sin\psi_L - \cos\mu_S \sin\psi_S) + \cos\rho(\cos\mu_L - \cos\mu_S) + \sin\rho(\sin\mu_L \sin\psi_L - \sin\mu_S \sin\psi_S)$$

$$\phi = \tan^{-1}\{[K \sin\rho(\cos\mu_L \sin\psi_L - \cos\mu_S \sin\psi_S) - K \cos\rho(\sin\mu_L - \sin\mu_S) + \cos\rho(\cos\mu_L - \cos\mu_S) + \sin\rho(\sin\mu_L \sin\psi_L - \sin\mu_S \sin\psi_S)] / [(\sin\mu_L \cos\psi_L - \sin\mu_S \cos\psi_S) + K(\cos\mu_L \cos\psi_L - \cos\mu_S \cos\psi_S)]\} \quad\quad 23.$$

Next, we find the hard iron component in the X direction by expanding equation 18 for $H_{HSmeasX}$ for both level and sloped:

$$H_{HSmeasX} = He(\cos\phi \cos\rho \cos\mu + \sin\mu \sin\psi \cos\phi \sin\rho - \sin\mu \cos\psi \sin\phi) + H_{HIX}$$

$$H_{HSmeasX\_L} = He(\cos\phi \cos\rho \cos\mu_L + \sin\mu_L \sin\psi_L \cos\phi \sin\rho - \sin\mu_L \cos\psi_L \sin\phi) + H_{HIX}$$

$$H_{HSmeasX\_S} = He(\cos\phi \cos\rho \cos\mu_S + \sin\mu_S \sin\psi_S \cos\phi \sin\rho - \sin\mu_S \cos\psi_S \sin\phi) + H_{HIX}$$

Solving for He and Setting Equal:

$$(H_{HSmeasX\_L} - H_{HIX})/(\cos\phi \cos\rho \cos\mu_L + \sin\mu_L \sin\psi_L \cos\phi \sin\rho - \sin\mu_L \cos\psi_L \sin\phi) = (H_{HSmeasX\_S} - H_{HIX})/(\cos\phi \cos\rho \cos\mu_S + \sin\mu_S \sin\psi_S \cos\phi \sin\rho - \sin\mu_S \cos\psi_S \sin\phi)$$

$$\text{Ratio} = (\cos\phi \cos\rho \cos\mu_L + \sin\mu_L \sin\psi_L \cos\phi \sin\rho - \sin\mu_L \cos\psi_L \sin\phi)/(\cos\phi \cos\rho \cos\mu_S + \sin\mu_S \sin\psi_S \cos\phi \sin\rho - \sin\mu_S \cos\psi_S \sin\phi)$$

$$H_{HSmeasX\_L} - H_{HIX} = (H_{HSmeasX\_S} - H_{HIX}) \text{Ratio}$$

$$H_{HIX} - H_{HIX} \text{Ratio} = H_{HSmeasX\_L} - H_{HSmeasX\_S} \text{Ratio}$$

$$H_{HIX} = (H_{HSmeasX\_L} - H_{HSmeasX\_S} \text{Ratio})/(1 - \text{Ratio}) \quad\quad 24.$$

We find the hard iron component in the Z direction by expanding equation 18 for $H_{HSmeasZ}$ for both level and sloped:

$$H_{HSmeasZ} = He(\cos\phi \cos\rho \sin\mu - \cos\phi \sin\rho \cos\mu \sin\psi + \sin\phi \cos\mu \cos\psi) + H_{HIZ}$$

$$H_{HSmeasZ\_L} = He(\cos\phi \cos\rho \sin\mu_L - \cos\phi \sin\rho \cos\mu_L \sin\psi_L + \sin\phi \cos\mu_L \cos\psi_L) + H_{HIZ}$$

$$H_{HSmeasZ\_S} = He(\cos\phi \cos\rho \sin\mu_S - \cos\phi \sin\rho \cos\mu_S \sin\psi_S + \sin\phi \cos\mu_S \cos\psi_S) + H_{HIZ}$$

Solving for He and Setting Equal:

$$(H_{HSmeasZ\_L} - H_{HIZ})/(\cos\phi \cos\rho \sin\mu_L - \cos\phi \sin\rho \cos\mu_L \sin\psi_L + \sin\phi \cos\mu_L \cos\psi_L) = (H_{HSmeasZ\_S} - H_{HIZ})/(\cos\phi \cos\rho \sin\mu_S - \cos\phi \sin\rho \cos\mu_S \sin\psi_S + \sin\phi \cos\mu_S \cos\psi_S)$$

$$\text{Ratio} = (\cos\phi \cos\rho \sin\mu_L - \cos\phi \sin\rho \cos\mu_L \sin\psi_L + \sin\phi \cos\mu_L \cos\psi_L)/(\cos\phi \cos\rho \sin\mu_S - \cos\phi \sin\rho \cos\mu_S \sin\psi_S + \sin\phi \cos\mu_S \cos\psi_S)$$

$$H_{HSmeasZ\_L} - H_{HIZ} = (H_{HSmeasZ\_S} - H_{HIZ}) \text{Ratio}$$

$$H_{HIZ} - H_{HIZ} \text{Ratio} = H_{HSmeasZ\_L} - H_{HSmeasZ\_S} \text{Ratio}$$

$$H_{HIZ} - H_{HIZ} \text{Ratio} = H_{HSmeasZ\_L} - H_{HSmeasZ\_S} \text{Ratio}/(1 - \text{Ratio}) \quad\quad 25.$$

Next, we find the hard iron component in the Y direction by collecting magnetic data with the machine rotated ccw and cw about the northerly direction with the understanding that the earth's magnetic field strength is constant (for the time required to calibrate and as the machine changes orientation):

$$He^2 = (H_{HSmeasX\_CCW} - H_{HIX})^2 + (H_{HSmeasY\_CCW} - H_{HIY})^2 + (H_{HSmeasZ\_CCW} - H_{HIZ})^2$$

$$He^2 = (H_{HSmeasX\_CW} - H_{HIX})^2 + (H_{HSmeasY\_CW} - H_{HIY})^2 + (H_{HSmeasZ\_CW} - H_{HIZ})^2$$

$$(H_{HSmeasX\_CCW}-H_{HIX})^2+(H_{HSmeasY\_CCW}-H_{HIY})^2+$$
$$(H_{HSmeasZ\_CCW}-H_{HIZ})^2=(H_{HSmeasX\_CW}-$$
$$H_{HIX})^2+(H_{HSmeasY\_CW}-H_{HIY})^2+(H_{HSmeasZ\_CW}-$$
$$H_{HIZ})^2$$

$$(H_{HSmeasY\_CCW}-H_{HIY})^2-(H_{HSmeasY\_CW}-H_{HIY})^2=$$
$$(H_{HSmeasX\_CW}-H_{HIX})^2+(H_{HSmeasZ\_CW}-H_{HIZ})^2-$$
$$(H_{HSmeasX\_CCW}-H_{HIX})^2-(H_{HSmeasZ\_CCW}-$$
$$H_{HIZ})^2$$

$$H_{HSmeasY\_CCW}^2-2H_{HSmeasY\_CCW}H_{HIY}+H_{HIY}^2-$$
$$(H_{HSmeasY\_CW}^2-2H_{HSmeasY\_CW}H_{HIY}+H_{HIY}^2)=$$
$$(H_{HSmeasX\_CW}-H_{HIX})^2+(H_{HSmeasZ\_CW}-H_{HIZ})^2-$$
$$(H_{HSmeasX\_CCW}-H_{HIX})^2-(H_{HSmeasZ\_CCW}-$$
$$H_{HIZ})^2$$

$$2H_{HSmeasY\_CW}H_{HIY}-2H_{HSmeasY\_CCW}H_{HIY}=$$
$$(H_{HSmeasX\_CW}-H_{HIX})^2+(H_{HSmeasZ\_CW}-H_{HIZ})^2-$$
$$(H_{HSmeasX\_CCW}-H_{HIX})^2-(H_{HSmeasZ\_CCW}-$$
$$H_{HIZ})^2-H_{HSmeasY\_CCW}^2+H_{HSmeasY\_CW}^2$$

$$H_{HIY}=[(H_{HSmeasX\_CW}-H_{HIX})^2+(H_{HSmeasZ\_CW}-$$
$$H_{HIZ})^2-(H_{HSmeasX\_CCW}-H_{HIX})^2-$$
$$(H_{HSmeasZ\_CCW}-H_{HIZ})^2-H_{HSmeasY\_CCW}^2+$$
$$H_{HSmeasY\_CW}^2]/[2(H_{HSmeasY\_CW}-$$
$$H_{HSmeasY\_CCW})] \qquad 26.$$

Next, we turn to the soft iron calibration. The soft iron calibration is necessary in order to remove any non-linearity caused by distortions of the earth's magnetic field. There are numerous published methods to solve this issue. The most common, and least resource intensive method, is to best fit a unit circle in the horizontal plane. There are limits to the accuracy obtainable with this approach, however. The best way to solve this problem is to rotate the sensor one complete revolution and compare the calculated heading against a "source of truth," i.e., an indication of actual heading. With a source of truth, a lookup table can be created to compensate for the distortions. The main difficulty with this task is locating a source of truth at the calibration site.

The present method uses a gyroscope on the machine to determine the angular orientation of the measured values taken during the revolution of the sensor. If we integrate the gyro signal, we develop a table of values at evenly spaced angular increments during one complete revolution. The difficulty with this approach is that the gyroscopic sensor output has errors due to non-linearity, temperature, and null offset drift. To solve these problems, the method rescales the gyro output during the calibration process. A single magnetometer axis can provide the sensor with a reference point indicating that the machine and the sensor have rotated exactly 360 degrees. The scale factor can then be adjusted until the integration of the gyroscope signal is exactly 360 degrees through each pass of the reference point. In order to solve the null offset drift problem, the machine is stationary at the start of the calibration to measure the offset. The rotational data collection part of the calibration is accomplished with the machine rotating at a uniform rotational speed. The drift in field values should be minimal during this short period of time.

Figure 5:
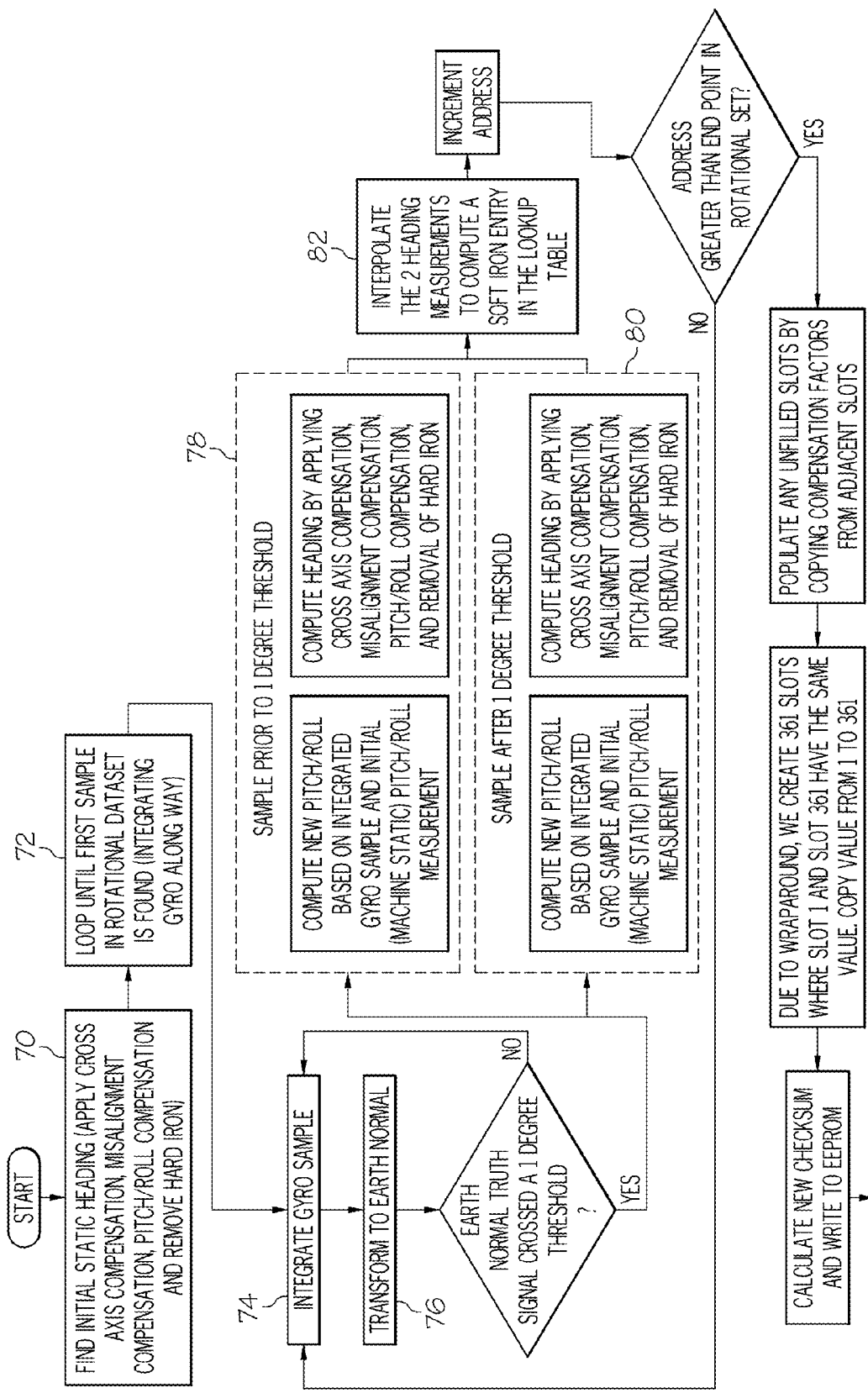
FIG. 5 is a flow chart illustrating soft iron compensation calculations.

Now that a source of heading truth has been established, the system internally populates a soft iron calibration lookup table. The soft iron algorithm is illustrated in the flowchart of FIG. 5.

Since the rotation is about the Z axis 34, the truth signal is in the compass plane. The soft iron table, however, is computed in the earth normal plane. For calibrations performed on fairly level surfaces, the difference between compass plane and earth normal plane is negligible. Below is a table summarizing the maximum error between compass plane and earth normal plane for various slopes, if the truth signal is not transformed to earth normal plane:

| Slope | Maximum Error Between Planes |
|---|---|
| 1 degree | 0.01 degree heading error |
| 2 degree | 0.02 degree heading error |
| 3 degree | 0.04 degree heading error |
| 10 degree | 0.43 degree heading error |
| 20 degree | 1.78 degree heading error |

Translate the compass plane truth signal to earth normal, as follows. First, find the maximum/minimum pitch and the rotational offset for a given initial pitch and initial roll.

$$\text{Offset}=a\tan(-\sin(\text{InitialRoll})/\sin(\text{InitialPitch}));$$

$$\text{PitchAmplitude}=-a\sin(\sin(\text{InitialRoll})*\sin(\text{Offset})-\sin(\text{InitialPitch})*\cos(\text{Offset}));$$

Calculate the {X, Y, Z} coordinates for a given rotational offset after integrating the gyro signal:

$$X=-\cos(\text{PitchAmplitude})*\sin(\text{IntegratedAngle}-\text{Offset}+270°)$$

$$Y=\sin(\text{IntegratedAngle}-\text{Offset})$$

$$Z=\sin(\text{PitchAmplitude})*\sin(\text{IntegratedAngle}-\text{Offset}+270°)$$

These equations were determined by developing a simultaneous set of equations after defining three vectors. The three vectors were: i) Along the X axis in the compass plane (determined from InitialPitch). Call this vector V1. ii) Along the Y axis in the compass plane (determined from InitialRoll). Call this vector V2. iii) The normal vector about V1 and V2. Call this vector N.

Next, the cross product rule was used to establish 6 sets of equations to find the unknown vector which we will call B.

$$V1 \times B = len(V1)*len(B)*\sin(\text{IntegratedAngle})*N$$

$$V2 \times B = len(V2)*len(B)*\sin(\text{IntegratedAngle}+270°)*N$$

$$len(V1)=len(V2)=len(B)=1$$

Once the X/Y coordinates are found, we can easily find the earth normal heading: a tan 2(Y/X).

Referring again to FIG. 5, it can be seen that an initial static heading is determined at 70. This is essentially benching the machine in a known direction at the work site. Next the machine is rotated through one rotation at a constant rotational speed, as indicated at 72. The data from the gyroscopic sensor is integrated at 74, and the magnetic sensor values transformed into an earth normal coordinate system at 76. This continues until the earth normal rotational signal crosses a 1 degree threshold. The values are then sampled prior to the 1 degree threshold and after the 1 degree threshold at 78 and 80, and interpolated at 82 to produce data for the next point in the data look up table. This process continues until a data from a complete rotation has been stored.

The soft iron calibration works well to compensate for horizontal distortions of the earth's magnetic field. However, it cannot compensate for any distortions created in the vertical axis. Through experimentation it was discovered that this vertical distortion can be compensated for by characterizing the distortion through one complete revolution. If we assume that the Z axis of the magnetic sensor is installed parallel to the Z axis 34 of machine rotation, measurements collected on the Z axis magnetometer should be constant. Deviations from this are a measure of the vertical soft iron distortion. To characterize and subsequently compensate for this, the amplitude and phase shift of the Z axis measurements through one full revolution are computed.

These characteristics are a function of heading. We first use the raw measurements to compute a rough heading estimate, compensate the Z axis measurement through the characteristic equation, and then re-compute the final heading measurement. We can do this for two reasons: i) The soft iron effects are sinusoidal so between any 5-10 degrees in heading the effects will be similar, and ii) Z axis accuracy is not as critical as X/Y axis accuracy (especially with smaller slopes).

It should be appreciated that in some circumstances it may not be possible for the machine to make an entire 360 degree rotation as a part of the process of building the soft iron calibration table. For example, the terrain or structures close to the machine may prevent such movement. In this instance a partial rotation of the machine may be made, with data being collected during the partial rotation. Since the uncompensated outputs of the magnetic field sensor cannot be used to rescale or recalibrate the gyroscopic sensor when less than a full rotation is being made, it will be appreciated that the accuracy achieved when operating in this manner will be less.

What is claimed is:

1. A method of determining the heading of an excavator at a worksite using a magnetic field sensor, mounted on the excavator, said magnetic field sensor providing indications of the magnitude of the magnetic field of the earth in the X, Y and Z directions of the sensor, using inclinometers that provide an indication of the pitch and roll of the excavator, using a gyroscopic sensor for sensing rotation of the excavator about the Z axis of the magnetic field sensor, and using a processor circuit, having an associated memory, responsive to said magnetic field sensor, said inclinometers, and said gyroscopic sensor, comprising:
  creating and storing a calibration table of data, including
    rotating said excavator at substantially constant speed about a generally vertical Z axis,
    storing the outputs from said magnetic field sensor, and said gyroscopic sensor,
    determining the beginning and end of a complete rotation of the excavator based on the repetition of data values from said magnetic field sensor, and
    scaling the data received from said gyroscopic sensor during the complete rotation and the corresponding data received from the magnetic field sensor into substantially equal angular increments, and storing such scaled data,
  sensing the magnetic field at the excavator with the magnetic field sensor, providing indications of the magnitude of the magnetic field in the X, Y and Z directions of the sensor,
  transforming the sensed indications of the magnetic field from the X, Y and Z coordinate reference frame of the sensor to the local level plane coordinate reference frame using the outputs from the inclinometers,
  determining the hard iron components of the transformed sensed indication of the magnetic field and removing such hard iron components to produce corrected indications of the magnetic field in the local level plane coordinate reference frame, and
  comparing the corrected indications to the stored, scaled data to determine the heading of the excavator.

2. The method of claim 1, in which creating and storing a calibration table of data includes compensating the stored outputs for hard iron induced errors.

3. The method of claim 1, in which scaling the data received from said gyroscopic sensor during the complete rotation and the corresponding indications data received from the magnetic field sensor into substantially equal angular increments comprises scaling the data received from said gyroscopic sensor during the complete rotation and the corresponding indications data received from the magnetic field sensor into equal increments.

4. The method of claim 1, in which determining the hard iron components of the transformed sensed indication of the magnetic field comprises
  positioning the excavator to have a heading substantially toward magnetic north,
  sensing the magnetic field at the excavator with the magnetic field sensor, providing indications of the magnitude of the magnetic field in the X, Y and Z directions of the sensor,
  sensing the pitch and roll of the excavator,
  pitching the excavator by a few degrees,
  sensing the magnetic field at the excavator with the magnetic field sensor, providing indications of the magnitude of the magnetic field in the X, Y and Z directions of the sensor, and
  sensing the pitch and roll of the excavator.

5. The method of claim 1, in which creating and storing a calibration table of data further includes benching the excavator by rotating it to a predetermined reference heading, and determining the corresponding data from the table which represents the predetermined heading, whereby the balance of the data represents headings of the excavator in angular increments away from the predetermined reference heading.

6. A method of determining the heading of an excavator and compensating for soft iron errors at a worksite using a magnetic field sensor, mounted on the excavator, said magnetic field sensor providing indications of the magnitude of the magnetic field of the earth in the X, Y and Z directions of the sensor, using gravity reference sensors that provide an indication of the pitch and roll of the excavator, using a gyroscopic sensor for sensing rotation of the excavator about the Z axis of the magnetic field sensor, and using a processor circuit, having an associated memory, responsive to said magnetic field sensor, said inclinometers, and said gyroscopic sensor, comprising:
  creating and storing a calibration table of data, including
    noting the pitch and roll of the excavator,
    rotating said excavator at substantially constant speed about a substantially vertical Z axis through a complete rotation,
    storing the outputs from said magnetic field sensor, said inclinometers, and said gyroscopic sensor,
    determining the beginning and end of a complete rotation of the excavator based on the repetition of data values from said magnetic field sensor, and
    scaling the data received from said gyroscopic sensor during the complete rotation and the corresponding data received from the magnetic field sensor into substantially equal angular increments, and storing such scaled data,
  sensing the magnetic field at the excavator with the magnetic field sensor, providing indications of the magnitude of the magnetic field in the X, Y and Z directions of the sensor,
  transforming the sensed indications of the magnetic field from the X, Y and Z coordinate reference frame of the sensor to the local level plane coordinate reference frame using the outputs from the inclinometers, and comparing the corrected indications to the stored, scaled data to determine the heading of the excavator.

7. The method of claim 6, in which creating and storing a calibration table of data includes compensating the stored outputs for hard iron induced errors.

8. The method of claim 6, in which scaling the data received from said gyroscopic sensor during the complete rotation and the corresponding indications data received from the magnetic field sensor into substantially equal angular increments comprises scaling the data received from said gyroscopic sensor during the complete rotation and the corresponding indications data received from the magnetic field sensor into one degree increments.

9. The method of claim 6, in which determining the hard iron components of the transformed sensed indication of the magnetic field comprises
    positioning the excavator to have a heading substantially toward magnetic north,
    sensing the magnetic field at the excavator with the magnetic field sensor, providing indications of the magnitude of the magnetic field in the X, Y and Z directions of the sensor,
    sensing the pitch and roll of the excavator,
    pitching the excavator by a few degrees,
    sensing the magnetic field at the excavator with the magnetic field sensor, providing indications of the magnitude of the magnetic field in the X, Y and Z directions of the sensor, and
    sensing the pitch and roll of the excavator.

10. The method of claim 6, in which creating and storing a calibration table of data further includes benching the excavator by rotating it to a predetermined reference heading, and determining the corresponding data from the table which represents the predetermined heading, whereby the balance of the data represents headings of the excavator in angular increments away from the predetermined reference heading.

11. A method of determining the heading of an excavator at a worksite using a magnetic field sensor, mounted on the excavator, said magnetic field sensor providing indications of the magnitude of the magnetic field of the earth in the X, Y and Z directions of the sensor, using inclinometers that provide an indication of the pitch and roll of the excavator, using a gyroscopic sensor for sensing rotation of the excavator about the Z axis of the magnetic field sensor, and using a processor circuit, having an associated memory, responsive to said magnetic field sensor, said inclinometers, and said gyroscopic sensor, comprising:
    creating and storing a calibration table of data, including
        rotating said excavator about a generally vertical Z axis through less than a complete rotation,
        storing the outputs from said magnetic field sensor, and said gyroscopic sensor, and
        separating the data received from said gyroscopic sensor during the less than complete rotation and the corresponding data received from the magnetic field sensor into substantially equal angular increments, and storing such data,
    sensing the magnetic field at the excavator with the magnetic field sensor, providing indications of the magnitude of the magnetic field in the X, Y and Z directions of the sensor,
    transforming the sensed indications of the magnetic field from the X, Y and Z coordinate reference frame of the sensor to the local level plane coordinate reference frame using the outputs from the inclinometers,
    determining the hard iron components of the transformed sensed indication of the magnetic field and removing such hard iron components to produce corrected indications of the magnetic field in the local level plane coordinate reference frame, and
    comparing the corrected indications to the stored, scaled data to determine the heading of the excavator.

12. The method of claim 11, in which creating and storing a calibration table of data includes compensating the stored outputs for hard iron induced errors.

13. The method of claim 11, in which scaling the data received from said gyroscopic sensor during the less than complete rotation and the corresponding indications data received from the magnetic field sensor into substantially equal angular increments comprises separating the data received from said gyroscopic sensor during the less than complete rotation and the corresponding indications data received from the magnetic field sensor into equal increments.

14. The method of claim 11, in which determining the hard iron components of the transformed sensed indication of the magnetic field comprises
    positioning the excavator to have a heading substantially toward magnetic north,
    sensing the magnetic field at the excavator with the magnetic field sensor, providing indications of the magnitude of the magnetic field in the X, Y and Z directions of the sensor,
    sensing the pitch and roll of the excavator,
    pitching the excavator by a few degrees,
    sensing the magnetic field at the excavator with the magnetic field sensor, providing indications of the magnitude of the magnetic field in the X, Y and Z directions of the sensor, and
    sensing the pitch and roll of the excavator.

15. The method of claim 11, in which creating and storing a calibration table of data further includes benching the excavator by rotating it to a predetermined reference heading, and determining the corresponding data from the table which represents the predetermined heading, whereby the balance of the data represents headings of the excavator in angular increments away from the predetermined reference heading.

16. A method of determining the heading of an excavator and compensating for soft iron errors at a worksite using a magnetic field sensor, mounted on the excavator, said magnetic field sensor providing indications of the magnitude of the magnetic field of the earth in the X, Y and Z directions of the sensor, using gravity reference sensors that provide an indication of the pitch and roll of the excavator, using a gyroscopic sensor for sensing rotation of the excavator about the Z axis of the magnetic field sensor, and using a processor circuit, having an associated memory, responsive to said magnetic field sensor, said inclinometers, and said gyroscopic sensor, comprising:
    creating and storing a calibration table of data, including
        noting the pitch and roll of the excavator,
        rotating said excavator about a substantially vertical Z axis through less than a complete rotation,
        storing the outputs from said magnetic field sensor, said inclinometers, and said gyroscopic sensor, and
        separating the data received from said gyroscopic sensor during the less than complete rotation and the corresponding data received from the magnetic field sensor into substantially equal angular increments, and storing such scaled data,
    sensing the magnetic field at the excavator with the magnetic field sensor, providing indications of the magnitude of the magnetic field in the X, Y and Z directions of the sensor, transforming the sensed indications of the magnetic field from the X, Y and Z coordinate reference frame of the sensor to the local level plane coordinate reference frame using the outputs from the inclinometers, and comparing the corrected indications to the stored, scaled data to determine the heading of the excavator.

17. The method of claim 16, in which creating and storing a calibration table of data includes compensating the stored outputs for hard iron induced errors.

18. The method of claim 16, in which scaling the data received from said gyroscopic sensor during the less than complete rotation and the corresponding indications data received from the magnetic field sensor into substantially equal angular increments comprises separating the data received from said gyroscopic sensor during the less than complete rotation and the corresponding indications data received from the magnetic field sensor into equal increments.

19. The method of claim 16, in which determining the hard iron components of the transformed sensed indication of the magnetic field comprises positioning the excavator to have a heading substantially toward magnetic north, sensing the magnetic field at the excavator with the magnetic field sensor, providing indications of the magnitude of the magnetic field in the X, Y and Z directions of the sensor, sensing the pitch and roll of the excavator, pitching the excavator by a few degrees, sensing the magnetic field at the excavator with the magnetic field sensor, providing indications of the magnitude of the magnetic field in the X, Y and Z directions of the sensor, and sensing the pitch and roll of the excavator.

20. The method of claim 16, in which creating and storing a calibration table of data further includes benching the excavator by rotating it to a predetermined reference heading, and determining the corresponding data from the table which represents the predetermined heading, whereby the balance of the data represents headings of the excavator in angular increments away from the predetermined reference heading.

* * * * *

UNITED STATES PATENT AND TRADEMARK OFFICE
CERTIFICATE OF CORRECTION

PATENT NO.      : 8,463,569 B2                                   Page 1 of 1
APPLICATION NO. : 13/052393
DATED           : June 11, 2013
INVENTOR(S)     : Gary Lynn Cain et al.

It is certified that error appears in the above-identified patent and that said Letters Patent is hereby corrected as shown below:

In the Specification

Col. 5, Line 48, "sin $(\alpha-\psi) = y'/l$" should read -- sin $(\alpha-\psi) = z'/l$ --.

Signed and Sealed this
Twelfth Day of August, 2014

Michelle K. Lee
*Deputy Director of the United States Patent and Trademark Office*